US008844320B2

(12) United States Patent
Isono et al.

(10) Patent No.: US 8,844,320 B2
(45) Date of Patent: *Sep. 30, 2014

(54) MANUFACTURING METHOD OF A SHEET GLASS MATERIAL FOR MAGNETIC DISK AND MANUFACTURING METHOD OF A GLASS SUBSTRATE FOR MAGNETIC DISK

(75) Inventors: Hideki Isono, Kofu (JP); Hidekazu Tanino, Tokyo (JP)

(73) Assignee: Hoya Corporation, Tokyo (JP)

( * ) Notice: Subject to any disclaimer, the term of this patent is extended or adjusted under 35 U.S.C. 154(b) by 33 days.

This patent is subject to a terminal disclaimer.

(21) Appl. No.: 13/435,838

(22) Filed: Mar. 30, 2012

(65) Prior Publication Data

US 2013/0086945 A1  Apr. 11, 2013

Related U.S. Application Data

(60) Provisional application No. 61/469,998, filed on Mar. 31, 2011.

(51) Int. Cl.
*C03B 11/00* (2006.01)
*C03B 11/08* (2006.01)
*B32B 15/00* (2006.01)

(52) U.S. Cl.
CPC ............ *C03B 11/084* (2013.01); *C03B 11/088* (2013.01); *C03B 2215/03* (2013.01); *C03B 2215/11* (2013.01); *C03B 11/086* (2013.01); *C03B 2215/50* (2013.01); *C03B 2215/16* (2013.01); *C03B 2215/44* (2013.01); *C03B 2215/70* (2013.01)
USPC .... 65/102; 65/90; 65/108; 65/122; 428/846.9

(58) Field of Classification Search
CPC .... C03B 11/05; C03B 11/088; C03B 11/125; C03B 11/14; C03B 2215/50; C03B 11/084; C03B 11/086; C03B 2215/11; C03B 2215/16; C03B 2215/44; C03B 2215/70; C03B 2215/03; C03C 17/23
USPC .............. 65/29.11, 29.14, 29.18, 29.19, 21.2, 65/21.5, 32.1, 64, 66, 162, 102, 157, 305, 65/123, 303, 374.12, 90, 108, 111, 112, 65/127, 122, 374, 121; 428/848.9, 410; 501/51, 70, 78; 264/1.1, 163
See application file for complete search history.

(56) References Cited

U.S. PATENT DOCUMENTS 5,275,637 A  *  1/1994  Sato et al. .......................... 65/66
2003/0131628 A1*  7/2003  Murakami et al. ............. 65/21.2

(Continued)

FOREIGN PATENT DOCUMENTS

| JP | 01-133948 | * | 5/1989 | ............. C03B 11/00 |
| JP | 3709033 B | | 8/2005 | |
| WO | 2010/032671 | * | 3/2010 | ............. C03B 11/08 |

*Primary Examiner* — Kevin M. Bernatz
*Assistant Examiner* — Louis Falasco
(74) *Attorney, Agent, or Firm* — Global IP Counselors, LLP (57) ABSTRACT

A manufacturing method of a sheet glass material for magnetic disk, the method includes, dropping process for dropping a lump of molten glass; pressing process for sandwiching simultaneously the lump from both sides of the dropping path of the lump with surfaces of a pair of dies facing together, and performing press forming to the lump to obtain a sheet glass material, wherein at least one of the pair of dies has a concave shape with respect to the dropping path of the lump.

13 Claims, 6 Drawing Sheets

(56) References Cited

U.S. PATENT DOCUMENTS

| | | |
|---|---|---|
| 2004/0194506 A1* | 10/2004 | Ueda et al. .................. 65/29.11 |
| 2004/0211222 A1* | 10/2004 | Hosoe ........................ 65/374.12 |
| 2004/0231362 A1* | 11/2004 | Nishikawa ........................ 65/66 |
| 2005/0178157 A1* | 8/2005 | Yoneda .......................... 65/32.1 |
| 2005/0204777 A1 | 9/2005 | Mori et al. |
| 2005/0244656 A1* | 11/2005 | Ikenishi et al. ................. 501/70 |
| 2007/0204654 A1* | 9/2007 | Fukumoto et al. ................ 65/66 |
| 2007/0225148 A1* | 9/2007 | Hayashi et al. ................... 65/66 |
| 2008/0293556 A1* | 11/2008 | Fujiwara ........................ 501/78 |
| 2010/0147029 A1* | 6/2010 | Ishigame et al. .................. 65/82 |
| 2010/0192635 A1* | 8/2010 | Sakata .............................. 65/66 |
| 2011/0162412 A1* | 7/2011 | Fukumoto et al. ................ 65/66 |

* cited by examiner

MANUFACTURING METHOD OF A SHEET GLASS MATERIAL FOR MAGNETIC DISK AND MANUFACTURING METHOD OF A GLASS SUBSTRATE FOR MAGNETIC DISK

CROSS-REFERENCE TO RELATED APPLICATION

This application is based upon and claims the benefit of priority of the U.S. Provisional Application No. 61/469,998 filed in the US Patent and Trademark Office on Mar. 31, 2011, the entire contents of which are incorporated herein by reference.

FIELD

The present invention relates to a manufacturing method of a sheet glass material for magnetic disk and a glass substrate for magnetic disk having a pair of principal surfaces.

TECHNICAL BACKGROUND

Recently, a hard disk device is incorporated in a personal computer, a notebook personal computer, and a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A glass substrate is suitably used as the substrate for the magnetic disk because a glass substrate is hardly plastically deformed compared with a metallic substrate.

The magnetic recording density is being increased in order to respond to a demand for an increase of a storage capacity in the hard disk device. For example, a magnetic recording information area is finely formed using a perpendicular magnetic recording system in which a magnetization direction of the magnetic layer is oriented toward a direction perpendicular to the substrate surface, which allows the storage capacity to be increased in a single disk substrate. In order to respond to the further increase of the storage capacity, a floating distance of the magnetic head from the magnetic recording surface is extremely shortened to form the fine magnetic recording information area. With such substrate of the magnetic disk, the magnetic layer is formed flat such that the magnetization direction of the magnetic layer is oriented toward the direction substantially perpendicular to the substrate surface. Therefore, the glass substrate is formed such that surface irregularity of the glass substrate is decreased as much as possible.

The shortened floating distance of the magnetic head may easily cause a head crush trouble or a thermal asperity trouble. Because these troubles are caused by the micro irregularity or a particle on the magnetic disk surface, the glass substrate is formed such that the surface irregularity of an end face is also decreased as much as possible in addition to that of the principal surface.

For example, the glass substrate used in the magnetic disk is manufactured by the following method: specifically, a glass gob made of molten glass (a lump of the glass material) is supplied onto a lower die that is a backing gob forming die; press forming is performed to the glass gob to prepare a sheet glass material using the lower die and an upper die that is a counter gob forming die; and the sheet glass material is formed into a glass substrate for information recording medium (for example, see Japanese Patent No. 3709033).

With the method disclosed in the Japanese Patent No. 3709033, after the glass gob made of the molten glass is supplied onto the lower die, the following steps are performed: a lower surface of a body for upper die and an upper surface of a body for lower die are abutted on together; a thin sheet glass forming space is formed outside a sliding surface between the upper die and the body for upper die and a sliding surface between the lower die and the body for lower die; the upper die is moved down to perform the press forming; and the upper die is moved up immediately after the press forming. Therefore, the sheet glass material that becomes a base of the glass substrate for magnetic disk is formed. Then, the glass substrate for magnetic disk is obtained after a grinding process and a polishing process.

In the grinding process, for example, grinding is performed using alumina loose abrasive grains. In the grinding process, a first grinding process and a second grinding process are performed using the loose abrasive grains having different particle sizes. A particle size of the loose abrasive grain used in the second grinding process is set smaller than that of the loose abrasive grain used in the first grinding process. Therefore, the coarse grinding and the fine grinding are performed in this order.

The polishing process includes, for example, a first polishing process in which the loose abrasive grain such as cerium oxide and a hard resin material polisher are used and a second polishing process in which colloidal silica and a soft resin material polisher are used. The particle size of the abrasive grain used in the first polishing process is smaller than that of the abrasive grain used in the second grinding process of the grinding process. The particle size of the abrasive grain used in the second polishing process is smaller than that of the abrasive grain used in the first polishing process.

Thus, in the surface processing of the glass substrate, the first grinding process, the second grinding process, the first polishing process, and the second polishing process are performed in this order, and the glass substrate is formed such that accuracy of surface quality such as surface roughness of the glass substrate is gradually enhanced.

Here, in forming the sheet glass material, a mold release agent is applied to the die surface in order to prevent the glass material from fusing to the die surfaces of the upper die and lower die. The surface roughness of the principal surface of the sheet glass material is increased because of the mold release agent. There is a large surface temperature difference between the upper die and the lower die, and the lower die to which the glass gob (a lump of the glass material) is supplied becomes high temperature. Because the surface temperature difference causes a temperature distribution in a thickness direction of the formed sheet glass material and in a plane of the plate, a shrinkage quantity of the sheet glass material that is taken out from the die and cooled also has a distribution in the thickness direction of the formed sheet glass material and in the plane of the plate. The sheet glass material is easy to warp, and therefore good flatness of the formed sheet glass material is not achieved.

The flatness of the sheet glass material can be improved by the grinding (first grinding process). For example, in the grinding process, a removal stock (ground quantity) is increased in order to improve the flatness. However, when the removal stock is increased in the grinding process, a deep crack may be generated in the surface of the sheet glass material. Therefore, in the polishing process that is a post-process, the removal stock (polishing quantity) is also inevitably increased in an attempt to eliminate the deep crack.

However, when the removal stock is increased in the polishing process in which the loose abrasive grains and the resin polisher are used, the neighborhood in the outer circumferential edge portion is rounded in the principal surface of the sheet glass material to cause a "roll-off problem" of the edge portion. That is, because the neighborhood in the outer circumferential edge portion is rounded in the sheet glass material, a distance between the magnetic layer and the magnetic head in the neighborhood of the outer circumferential edge portion becomes larger than the floating distance of the magnetic head in another portion of the glass substrate when the magnetic disk is prepared using the sheet glass material as the glass substrate. The surface irregularity is generated because the neighborhood of the outer circumferential edge portion has the rounded shape. As a result, the recording and reading operations of the magnetic head are not precisely performed in the magnetic layer in the neighborhood of the outer circumferential edge portion. This is the "roll-off problem".

When the removal stock is increased in the polishing process, a time necessary for the polishing process is unfavorably lengthened.

In view of the above, in order to improve flatness of a disk-shaped glass material after press formed, the inventor has studied a method including "dropping process for dropping a lump of molten glass; and pressing process for sandwiching simultaneously the lump from both sides of the dropping path of the lump with surfaces of a pair of dies facing together, and performing press forming to the lump to obtain a sheet glass material". With the method, use of a mold release agent is not required, and flatness may be improved because temperature difference is not likely to occur between the pair of dies.

However, as the inventor has studied, it has become clear that, with the manufacturing method described above, when viscosity of the molten glass is low particularly, the manufactured disk-shaped glass material has a shape of which length in the direction of drop is greater than that in the other directions. When glass of such irregular shape is used as a glass substrate for magnetic disk, it is required to cut the glass by growing a crack form one principal surface side to the other principal surface in so-called scribing process in order to make the glass disk-shaped. However, because glass of irregular shape is uneven in in-plane residue stress, a direction of the crack growing in the scribing process is unstable. Consequently, there may be a problem that chipping occurs at the outer circumference of the disk-shaped glass substrate, thereby largely degrading yield rate. In view of the above, there is a need to make a disk-shaped glass material substantially completely round in manufacturing the same with the above manufacturing method.

When a disk-shaped glass material is substantially completely round, removal stock in machining the outer edge of the glass material may be reduced. Thus, cost of the disk-shaped glass material may be reduced.

Further, when roundness of the disk-shaped glass material is 10 μm or less, it is not required to machine the outer edge of the glass material, thereby sustaining elution of the glass component (alkaline elution) of the outer edge of the glass material.

In view of the above, an object of the present invention is to provide a method of efficiently manufacturing a sheet glass material for magnetic disk and a glass substrate for magnetic disk excellent in roundness.

SUMMARY OF THE INVENTION

In order to solve the above problem, a first aspect of the present invention is a manufacturing method of a sheet glass material for magnetic disk, the method including dropping process for dropping a lump of molten glass; pressing process for sandwiching simultaneously the lump from both sides of the dropping path of the lump with surfaces of a pair of dies facing together, and performing press forming to the lump to obtain a sheet glass material, wherein at least one of the pair of dies has a concave shape with respect to the dropping path of the lump.

Preferably, the die having the concave shape with respect to the dropping path of the lump is formed by bonding a plurality of plates or thin films made of materials, each of which coefficient of thermal expansion is different, and wherein coefficient of thermal expansion of a plate or a thin film that contact the lump is the highest of those of the plurality of plates or thin films so that the die having the concave shape becomes flat by pressing the lump with the pair of dies.

Preferably, transition temperature Tg of the glass is equal to or higher than 600 degree Celsius.

Preferably, viscosity of the lump is equal to or lower than 700 dPa·s in the press forming process.

Preferably, temperatures of portions of the pair of dies that contact the lump are equal to or lower than a strain point of the glass.

Preferably, the glass contains, as converted based on the oxide, denoted as molar percentages: 50 to 75% $SiO_2$, 1 to 15% $Al_2O_3$, totally 5 to 35% at lease one component selected from the group of $Li_2O$, $Na_2O$, and $K_2O$, totally 0 to 20% at lease one component selected from the group of MgO, CaO, SrO, BaO, and ZnO, and totally 0 to 10% at lease one component selected from the group of $ZrO_2$, $TiO_2$, $La_2O_3$, $Y_2O_3$, $Ta_2O_5$, $Nb_2O_5$, and $HfO_2$.

Preferably, the pair of dies is made with a first plate and a second plate bonded together, and the first plate is arranged to contact the lump. Further, coefficient of thermal expansion of the first plate is higher than $10\times10^{-6}$/K while coefficient of thermal expansion of the second plate is lower than $10\times10^{-6}$/K.

Preferably, the first plate is made of Al alloy (7075), SUS304, Copper, Stellite (Co Alloy), FCD (Ductile Iron), SDK61 (alloy tool steel), Nickel (HASTELLOY), or SS41 (mild steel) while the second plate is made of Colmonoy (Ni alloy), Titanium, or VM40 (hard metal).

The second aspect of the present invention is a manufacturing method of a glass substrate for magnetic disk, the method including: dropping process for dropping a lump of molten glass; pressing process for sandwiching simultaneously the lump from both sides of the dropping path of the lump with surfaces of a pair of dies facing together, and performing press forming to the lump to obtain a sheet glass material; and machining process for machining the obtained sheet glass material, wherein at least one of the pair of dies has a concave shape with respect to the dropping path of the lump, and wherein the machining process includes grinding process for grinding the principal surfaces using fixed abrasive grains, and polishing process for polishing the principal surfaces using loose abrasive grains after the grinding process.

Preferably, the machining process includes chemically strengthening.

BRIEF DESCRIPTION OF THE DRAWINGS

Referring now to the attached drawings which form a part of this original disclosure.

DESCRIPTION OF THE PREFERRED EMBODIMENTS

First Embodiment

A manufacturing method of a glass substrate for magnetic disk according to the present invention will be described in detail below.

(Magnetic Disk and Glass Substrate for Magnetic Disk)

Figure 1A:
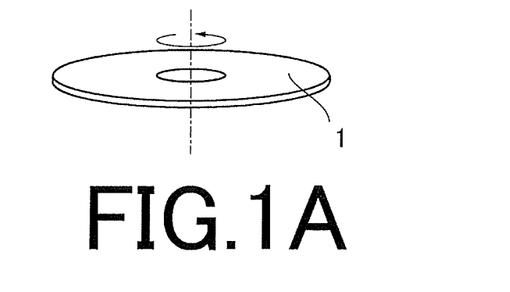
FIG. 1A is a view illustrating a magnetic disk prepared using a glass substrate for magnetic disk.
Figure 1B:
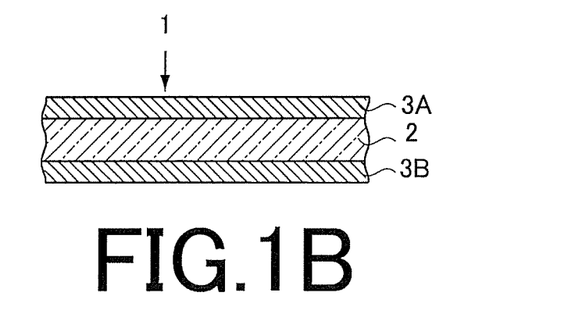
FIG. 1B is a view illustrating a section of the magnetic disk.
Figure 1C:
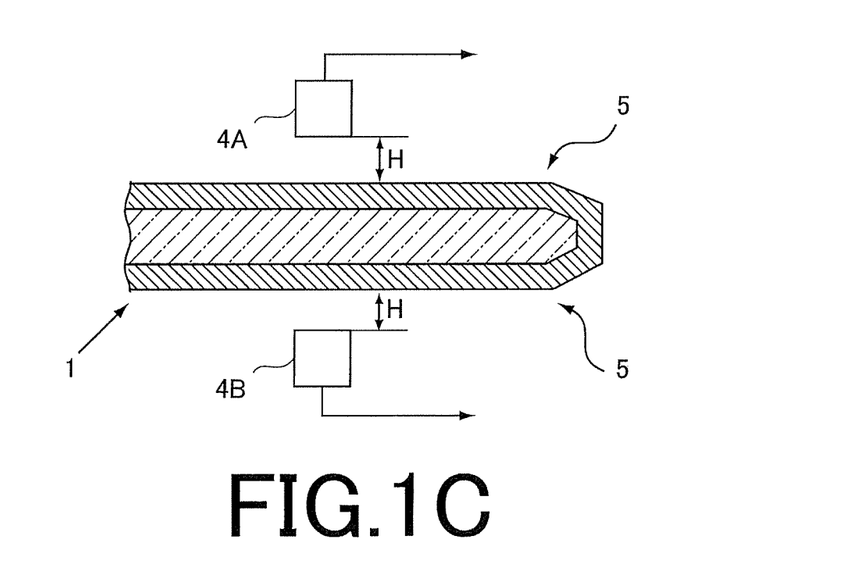
FIG. 1C is a view illustrating an arrangement in which a magnetic head is floated above the surface of the magnetic disk.

Referring now to FIGS. 1A to 1C, a magnetic disk manufactured using a glass substrate for magnetic disk will be explained. FIG. 1A is a view illustrating a magnetic disk prepared using a glass substrate for magnetic disk. FIG. 1B is a view illustrating a section of the magnetic disk. FIG. 1C is a view illustrating an arrangement in which a magnetic head is floated above the surface of the magnetic disk.

As illustrated in FIG. 1A, a magnetic disk 1 is a ring-shaped, and is driven around its axis of rotation. As illustrated in FIG. 1B, the magnetic disk 1 has a glass substrate 2 and at least magnetic layers 3A, 3B.

Note that, except the magnetic layers 3A, 3B, although not illustrated, an adhesive layer, a soft magnetic layer, a non-magnetic underlying layer, the perpendicular magnetic recording layer, a protective layer, and a lubricant layer are deposited. For example, Cr alloy is applied for the adhesive layer, and the adhesive layer acts as a bonding layer to the glass substrate 2. For example, CoTaZr alloy is applied for the soft magnetic layer. For example, Ru alloy is applied for the non-magnetic underlying layer. A granular magnetic layer is applied for the perpendicular magnetic recording layer. For example, material containing carbon hydride is applied for the protective layer. Fluorine resin is applied for the lubricant layer, for example.

The magnetic disk 1 will be described with a more specific example. A CrTi adhesive layer, a CoTaZr/Ru/CoTaZr soft magnetic layer, a Ru underlying layer, a CoCrPt—$SiO_2$—$TiO_2$ granular magnetic layer, and a carbon hydride protective layer are sequentially deposited in both the principal surfaces of the glass substrate 2 with a sputtering apparatus. A perfluoropolyether lubricant layer is then deposited on the uppermost layer by a dipping method.

When used in a hard disk device, the magnetic disk 1 rotates around the axis of rotation with rotation speed of 7,200 rpm for example. As illustrated in FIG. 1C, magnetic heads 4A and 4B of a hard disk device float from surfaces of the magnetic disk 1 by a distance H because of the high speed rotation of the magnetic disk 1. The distance H is 5 nm for example. At this point, the magnetic heads 4A and 4B record and read pieces of information in and from the magnetic layers. With the floating of the magnetic heads 4A and 4B, they record and read the information in and from the magnetic layer of the magnetic disk 1 at a short distance without sliding the magnetic heads 4A and 4B onto the magnetic layer, thereby realizing a fine magnetic recording information area and high density of the magnetic recording.

A central portion of the glass substrate 2 of the magnetic disk 1 to an outer circumferential edge portion 5 are precisely processed with target surface accuracy, and the magnetic heads 4A and 4B can be therefore precisely operated while the distance H of 5 nm is maintained.

Regarding surface irregularity of the principal surface of the glass substrate 2 used in the magnetic disk 1, flatness is 4 μm or less, and surface roughness is 0.2 nm or less. The flatness of 4 μm or less for example is target flatness required for the glass substrate for magnetic disk as a final product.

The flatness can be measured with a flatness tester FT-900 manufactured by NIDEK CO., LTD. for example.

The roughness of the principal surface Ra may be arithmetic average roughness Ra obtained with a scanning probe microscope (atomic force microscope) manufactured by SII Nano Technology Inc by measuring an area of 1 μm×1 μm with resolution of 512×256 pixels.

Aluminosilicate glass, soda-lime glass, and borosilicate glass can be used as a material for the glass substrate 2. Particularly, the aluminosilicate glass can be suitably used in that chemically strengthening can be performed and in that the glass substrate for magnetic disk excellent for the flatness of the principal surface and the strength of the substrate can be prepared.

Aluminosilicate glass is preferably used containing, denoted as molar percentages: 50 to 75% $SiO_2$, 1 to 15% $Al_2O_3$, totally 5 to 35% at lease one component selected from the group of $Li_2O$, $Na_2O$, and $K_2O$, totally 0 to 20% at lease one component selected from the group of MgO, CaO, SrO, BaO, and ZnO, and totally 0 to 10% at lease one component selected from the group of $ZrO_2$, $TiO_2$, $La_2O_3$, $Y_2O_3$, $Ta_2O_5$, $Nb_2O_5$, and $HfO_2$. A glass material containing, denoted as molar percentages: 57 to 74% $SiO_2$, 0 to 2.8% $ZnO_2$, 3 to 15% $Al_2O_3$, 7 to 16% $Li_2O$, 4 to 14% $Na_2O$ as the aluminosilicate glass may be also suitably used to perform chemically strengthening.

(Manufacturing Method of a Glass Substrate for Magnetic Disk)

Figure 2:
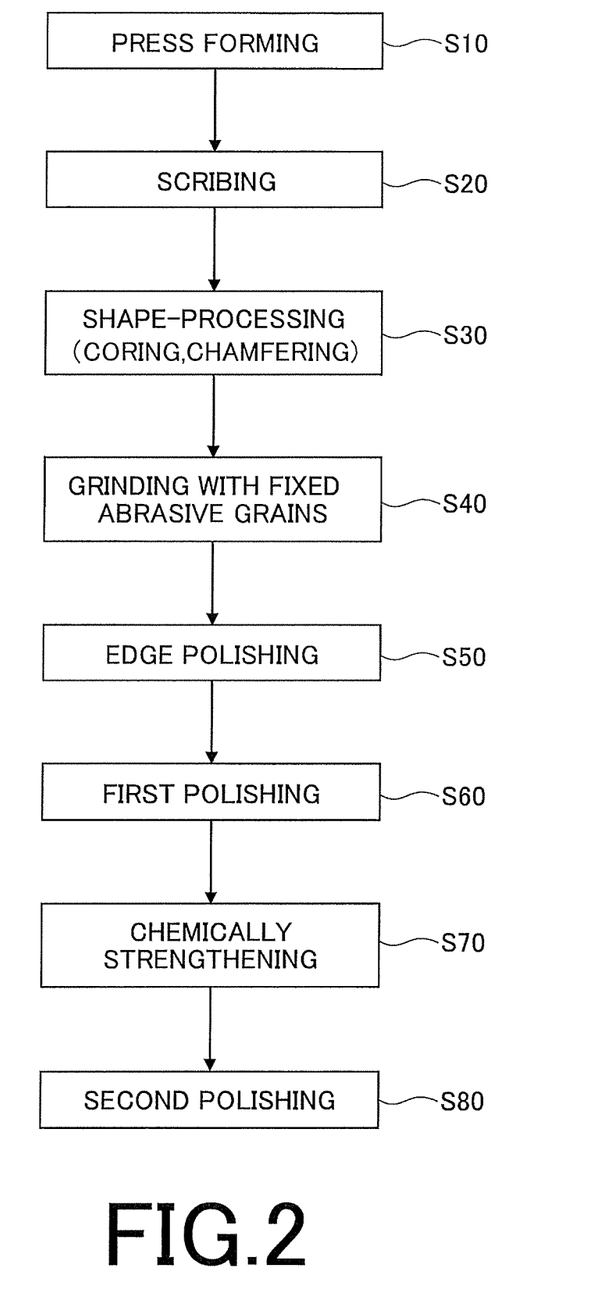
FIG. 2 is a view illustrating a flow of a manufacturing method of a glass substrate for magnetic disk according to the present invention.

Next, with reference to FIG. 2, a flow of a manufacturing method of a glass substrate for magnetic disk will be explained. FIG. 2 is a view illustrating a flow of an embodiment of a manufacturing method of a glass substrate for magnetic disk.

As illustrated in FIG. 2, a sheet glass material is manufactured by the press forming (Step S10). Next, the formed sheet glass material is scribed (Step S20). Next, the scribed sheet glass material is shape-processed (Step S30). Next, grinding is performed to the sheet glass material using fixed abrasive grains (Step S40). Then, edge polishing is performed to the sheet glass material (Step S50). First polishing is performed to the principal surface of the sheet glass material (Step S60). Next, after the first polishing, the sheet glass material is chemically strengthened (Step S70). Then, the second polishing is performed to the chemically strengthened sheet glass material (Step S80).

The detail of each process will be explained below.

(a) Press Forming Process

Figure 3:
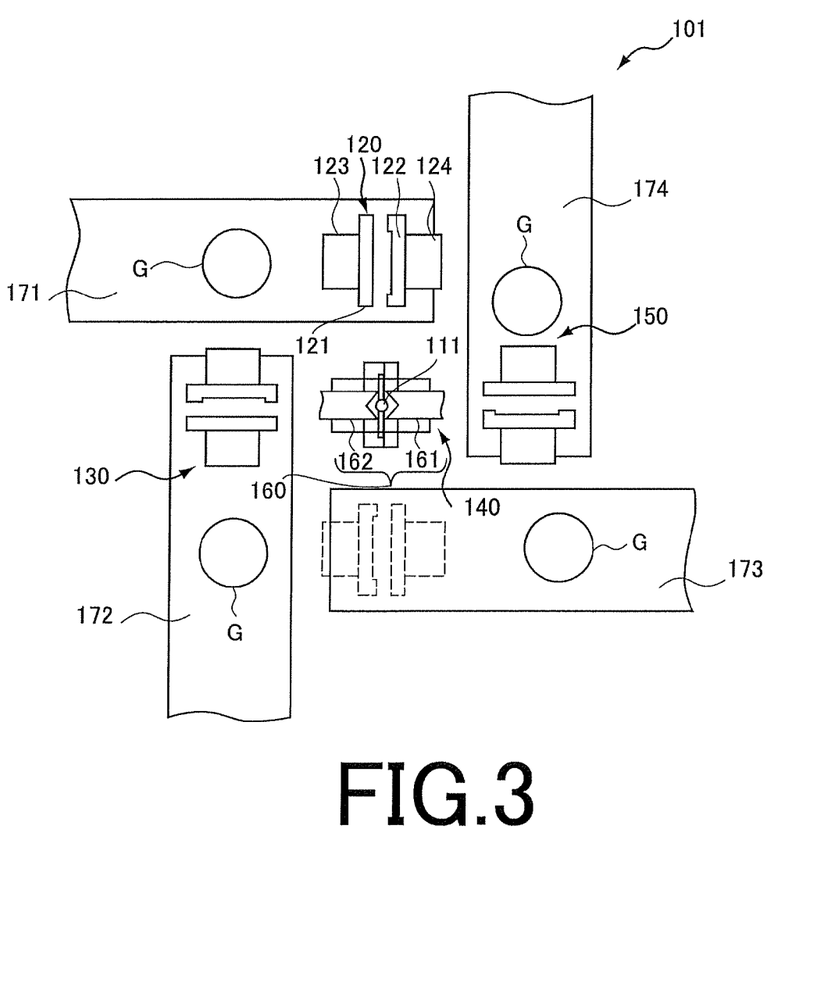
FIG. 3 is a plan view of an apparatus used in press forming.

Referring now to FIG. 3, the press forming process (Step S10) will be explained. FIG. 3 is a plan view of an apparatus used in press forming. As illustrated in FIG. 3, an apparatus 101 includes four sets of pressing units 120, 130, 140, 150, and a cutting unit 160.

The cutting unit 160 is arranged on a path of the molten glass that flows out from a molten glass outflow port 111. A lump of the molten glass is cut by the cutting unit 160 to drop down in vertically downward direction. Each of the pressing units 120, 130, 140, and 150 sandwiches the lump of the molten glass from both sides of the dropping path of the lump with facing surfaces of a pair of dies at the same timing, thereby forming a sheet glass material.

In the example illustrated in FIG. 3, the four sets of pressing units 120, 130, 140, and 150 are arranged at intervals of 90 degrees around the molten glass outflow port 111.

Here, viscosity of the molten glass ranges from 20 to 2,000 dPa·s when being formed (at temperature equal to or higher than 1,250 degree Celsius). When the viscosity is lower than 20 dPa·s, forming a sheet glass material is difficult due to low viscosity. On the other hand, when the viscosity is higher than 2,000 dPa·s, it is difficult to form a sheet glass material of a desired shape for a short period. Particularly, the present invention is preferably applied for a glass of which viscosity is equal to or lower than 700 dPa·s, more preferably, equal to or lower than 500 dPa·s. Transition temperature Tg of the molten glass equal to or is higher than 600 degree Celsius.

Each of the pressing units 120, 130, 140, and 150 is driven by a moving mechanism (not illustrated) so as to be able to proceed and retreat with respect to the molten glass outflow port 111. That is, each of the pressing units 120, 130, 140, and 150 can be moved between a catch position and a retreat position. The catch position (position where the pressing unit 140 is drawn by a solid line in FIG. 3) is located immediately below the molten glass outflow port 111. The retreat position (positions where the pressing units 120, 130, and 150 are drawn by solid lines in FIG. 3 and a position where the pressing units 140 is drawn with a broken line in FIG. 3) is located away from the molten glass outflow port 111.

The cutting unit 160 is arranged on a path of the molten glass between the catch position and the molten glass outflow port 111. The cutting unit 160 cuts the molten glass flowing out from the molten glass outflow port 111 to obtain a proper quantity of the lump of the molten glass (hereinafter also referred to as "gob"). The cutting unit 160 includes a first cutting blade 161 and a second cutting blade 162. The first cutting blade 161 and the second cutting blade 162 are driven so as to intersect each other on the path of the molten glass at constant timing. When the first cutting blade 161 and the second cutting blade 162 intersect each other, the molten glass is cut to obtain the gob. The obtained gob drops for the catch position in the vertically downward direction.

The pressing unit 120 includes a first die 121, a second die 122, a first driving unit 123, and a second driving unit 124.

Each of the first die 121 and the second die 122 is a member including a surface used to perform the press forming to the gob. The two surfaces are located so as to face together. The detailed arrangement of the first die 121 and the second die 122 will be explained later.

The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other. Each of the first driving unit 123 and the second driving unit 124 is, for example, a mechanism in which an air cylinder, a solenoid and a coil spring are combined.

Because each structure of the pressing units 130, 140, and 150 is the same as that of the pressing unit 120, the descriptions of the pressing units 130, 140, and 150 are omitted.

After each pressing unit moves to the catch position, the dropping gob is sandwiched between the first die and the second die by driving the first driving unit and the second driving unit, and the gob is formed into a predetermined thickness while rapidly cooled. Consequently, the disk-shaped sheet glass material G is prepared. After the pressing unit moves to the retreat position, the first die and the second die are separated to cause the formed sheet glass material G to drop down.

A first conveyer 171, a second conveyer 172, a third conveyer 173, and a fourth conveyer 174 are arranged below the retreat positions of the pressing units 120, 130, 140, and 150, respectively. Each of the first to fourth conveyers 171 to 174 receives the sheet glass material G that drops down from the corresponding pressing unit, and conveys the sheet glass material G to an apparatus (not illustrated) of the next process.

In the present embodiment, the pressing units 120, 130, 140, and 150 are configured to sequentially move to the catch position, and to move to the retreat position while sandwiching the gob. Thus, the sheet glass material G can continuously be formed without waiting for the cooling of the sheet glass material G in each pressing unit.

Note that the sheet glass material G may be continuously formed by sandwiching the gob by use of a single pressing unit 120. In this case, the first die 121 and the second die 122 are opened immediately after the press forming of the gob $G_G$, and press forms the subsequently dropping lump of the molten glass.

Figure 4A:
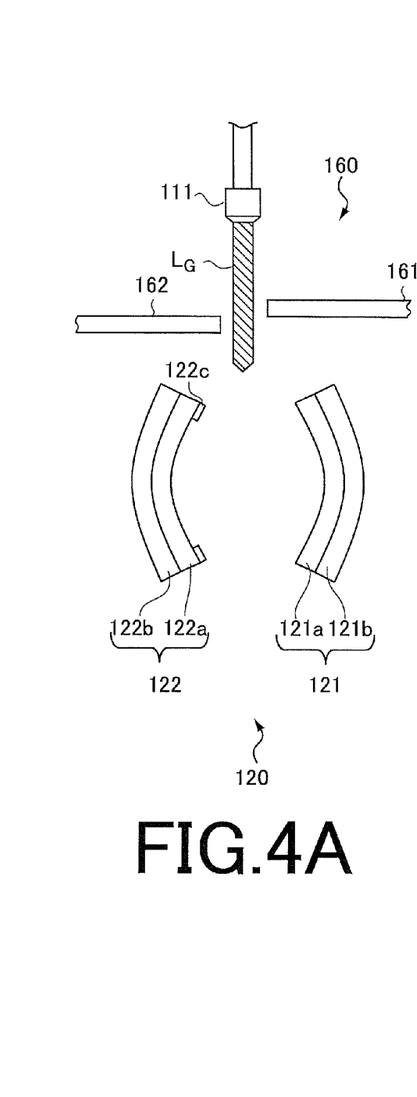
FIG. 4A is a side view illustrating an arrangement before the molten glass and a cutting unit contact.
Figure 4B:
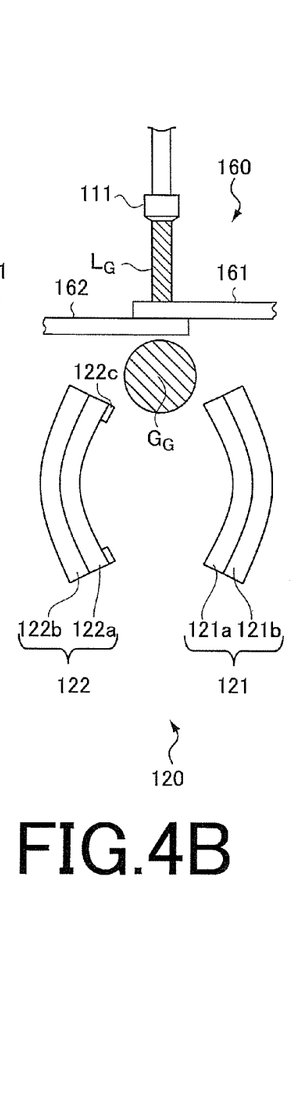
FIG. 4B is a side view illustrating an arrangement after the cutting unit cut the molten glass.
Figure 4C:
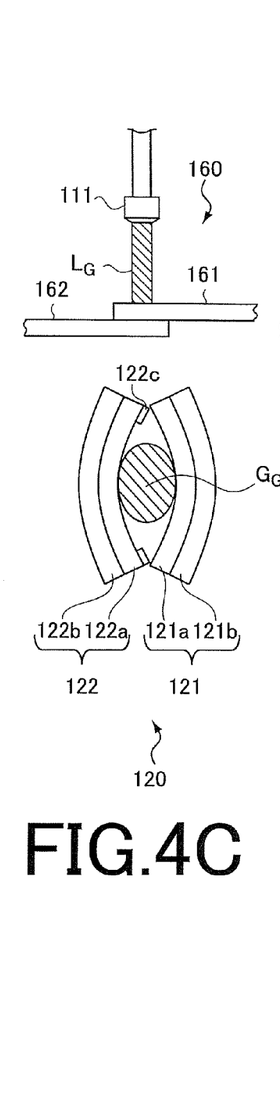
FIG. 4C is a side view illustrating an arrangement when a pressing unit begins to perform press forming to a lump of the molten glass.
Figure 4D:
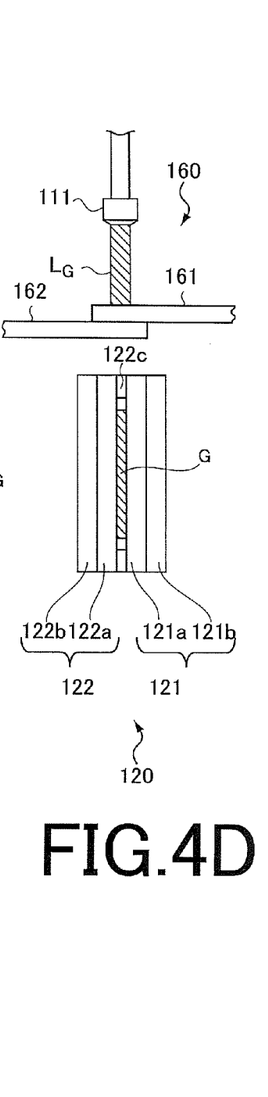
FIG. 4D is a side view illustrating an arrangement when a pressing unit is performing press forming to a lump of the molten glass.

Here, referring to the side views illustrated in FIGS. 4A to 4D, the press forming process according to the present embodiment will be explained. FIG. 4A is a side view illustrating an arrangement before a molten glass material $L_G$ and a cutting unit 160 contact. FIG. 4B is a side view illustrating an arrangement after the cutting unit 160 cut the molten glass material $L_G$. FIG. 4C is a side view illustrating an arrangement when the pressing unit 120 begins to press forming to a lump $G_G$ of the molten glass. FIG. 4D is a side view illustrating an arrangement when the pressing unit 120 is press forming to a lump $G_G$ of the molten glass.

Each of the first die 121 and the second die 122 is made with bimetal construction. More specifically, as illustrated in FIG. 4A, the first die 121 is made by bonding a first metal plate 121a and a second metal plate 121b together. The second die 122 is made by bonding a first metal plate 122a and a second metal plate 122b together. Preferably, the first metal plate and the second metal plate are bonded together with welding.

Here, coefficient of thermal expansion of the first metal plates 121a, 122a is higher than that of the second metal plates 121b, 122b. The coefficient of thermal expansion of the first metal plates 121a, 122a is higher than $10 \times 10^{-6}$/K for example. The coefficient of thermal expansion of the second metal plates 121b, 122b is lower than $10 \times 10^{-6}$/K, for example.

Al alloy (7075), SUS304, Copper, Stellite (Co Alloy), FCD (Ductile Iron), SDK61 (alloy tool steel), Nickel (HASTELLOY), or SS41 (mild steel) is used as the first metal plates 121a, 122a for example. Colmonoy (Ni alloy), Titanium, or VM40 (hard metal) for example may be used as the second metal plates 121b, 122b.

It should be noted that a plurality of thin films, each of which has different coefficient of thermal expansion, may be bonded to the pressing surfaces of the first die 121 and the second die 122. Further, the first die 121 and the second die 122 may be made of ceramics.

The first metal plates 121a, 122a are located closer to the dropping path side than the second metal plates 121b, 122b are.

In an arrangement before the pressing unit 120 contacts the gob $G_G$, the first metal plates 121a, 122a has a bowl-like concave shape with respect to the dropping path of the gob $G_G$. For example, this concave surface is a spherical surface formed with a gentle and continuous curved surface. When outer diameter of the die is 100 mm, amount of the most recessed part at the center may be 10 μm for example. Note that the above size is merely an example. Material, thickness, outer diameter, and/or the amount of the most recessed part of the die may be set so that the sheet glass material is finally made flat.

Temperatures of the first die 121 and the second die 122 are controlled by a temperature control mechanism (not illustrated) so that each die becomes a concave shape with respect to the dropping path of the gob $G_G$ before each die contacts the gob $G_G$. Note that the first die 121 and the second die 122 are made into a concave shape with rounding processing.

As illustrated in FIG. 4A, a molten glass material $L_G$ continuously flows out from the molten glass outflow port 111. As illustrated in FIG. 4B, the cutting unit 160 is driven at predetermined timing to cut the molten glass material $L_G$ by use of the cutting blades 161 and 162. Then, the cut molten glass becomes a substantially spherical gob $G_G$ due to a surface tension thereof. In the example illustrated in FIG. 4B, an outflow quantity per time of the molten glass material $L_G$ and a driving interval of the cutting unit 160 are adjusted such that a gob $G_G$ having radius of about 10 mm is formed every time the cutting unit 160 is driven.

The formed gob $G_G$ drops toward a gap between the first die 121 and the second die 122 of the pressing unit 120. When viscosity of the molten glass is low (equal to or lower than 700 dPa·s for example), the gob $G_G$ cut by the first cutting blade 161 and the second cutting blade 162 is likely to have a shape extending in the vertical direction.

The first driving unit 123 and the second driving unit 124 are driven such that the first die 121 and the second die 122 come close each other at the timing when the gob $G_G$ enters the gap between the first die 121 and the second die 122. As illustrated in FIG. 4C, this allows the concave first die 121 and the concave second die 122 to contact the center of the gob $G_G$ around the bottom of the dies. At this time, because each of the first die 121 and the second die 122 has a concave shape, the gob $G_G$ is hard to extend in the vertical direction and easy to extend toward relatively more space existing between the first die 121 and the second die 122 in the horizontal direction. Thus, even when the gob $G_G$ has a shape extending in the vertical direction, the gob $G_G$ extends so that roundness of the gob $G_G$ is improved.

It should be noted that the first driving unit 123 and the second driving unit 124 may control timing to drive the first die 121 and the second die 122 respectively such that the concave first die 121 and the concave second die 122 contact the center of the gob $G_G$ around the top of the dies.

Due to the contact of the gob $G_G$ to the first die 121 and the second die 122, heat of the gob $G_G$ is conducted to the first die 121 and the second die 122, which cause temperatures of the first die 121 and the second die 122 to increase. Because coefficient of thermal expansion of the first metal plates 121a, 122a is higher than that of the second metal plates 121b, 122b, when the temperatures of the first die 121 and the second die 122 increase, the first metal plates 121a, 122a are more largely deformed than the second metal plates 121b, 122b. Consequently, the first die 121 and the second die 122, which was concave to the dropping path of the gob $G_G$, has now become substantially flat as illustrated in FIG. 4D. At this time, inner surface (surface that contacts the gob $G_G$) of the first die 121 and inner surface (surface that contacts the gob $G_G$) of the second die 122 come close with a minute gap. Then, the gob $G_G$, which is sandwiched between the inner circumferential surface 121a of the first die 121 and the inner circumferential surface 122a of the second die 122, is formed into a thin sheet.

Note that a projected spacer 122c is provided at the inner circumferential surface 122a of the second die 122 in order to keep the gap constant between the inner circumferential surface 121a of the first die 121 and the inner circumferential surface 122a of the second die 122. The spacer 122c of the second die abuts on the inner circumferential surface 121a of the first die 121 so that the gap is kept constant between the inner circumferential surface 121a of the first die 121 and the inner circumferential surface 122a of the second die 122 to obtain a sheet-like space.

Although an example is explained above in which the projected spacer 122c is provided on the inner surface of the second die 122, a spacer may be independently provided from the first die 121 and the second die 122. Further, the first driving unit 123 and the second driving unit 124 may control the first die 121 and the second die 122 respectively so that the first die 121 and the second die 122 are separated by a predetermined distance, and does not come closer.

A temperature control mechanism (not illustrated) may be preferably provided in each of the first die 121 and second die 122. Preferably, with the temperature control mechanism, temperatures at the first die 121 and second die 122 may be maintained lower than a strain point of the molten glass material $L_G$.

A time until the portion of the gob $G_G$ is completely confined between the first die 121 and the second die 122 after the gob $G_G$ comes into contact with the inner circumferential surface 121a of the first die 121 or the inner circumferential surface 122a of the second die 122, is as extremely short as about 0.06 second. Therefore, the portion of the gob $G_G$ is formed into the substantially disk shape by spreading along the inner surface of the first die 121 and the inner surface of the second die 122 within an extremely short time, and the gob $G_G$ is rapidly cooled and solidified in the form of amorphous glass. Consequently, the disk-shaped sheet glass material G is prepared.

Note that, in the present embodiment, for example, the formed sheet glass material G may be a disk-shaped plate having a diameter of 75 to 80 mm and a thickness of about 1 mm.

After the first die 121 and the second die 122 are closed, the pressing unit 120 quickly moves to the retreat position. Then, the other pressing unit 130 moves to the catch position, and performs the pressing to the gob $G_G$.

After the pressing unit 120 moves to the retreat position, the first die 121 and the second die 122 are kept closed until the sheet glass material G is sufficiently cooled (for example, until temperature of the sheet glass material G becomes below a yield point). Then, the first driving unit 123 and the second driving unit 124 are driven to separate the first die 121 and the second die 122, and the sheet glass material G drops down from the pressing unit 120. The sheet glass material G is received by the conveyer 171 located below the pressing unit 120 (see FIG. 3).

Here, generally, when a gob $G_G$ is press formed, the gob $G_G$ is pressed while the gob $G_G$ stretches from the center of die for the pressing toward the circumference. When viscosity of the gob $G_G$ is low, the gob $G_G$ is likely to have a shape extending in the vertical direction. Thus, the manufactured sheet glass material G is likely to have an oval shape of which length in the vertical direction is greater than that in the horizontal direction.

By contrast, in the present embodiment, because each of the first die 121 and the second die 122 has a concave shape to the dropping path of the gob $G_G$, the gob $G_G$ is hard to stretch in the vertical direction even when viscosity of the gob $G_G$ is low. This allows roundness of the manufactured sheet glass material G to be improved. With the improvement in roundness of the manufactured sheet glass material G, removal stock in the later-described chamfering process may be reduced, and occurrence of cracks may be suppressed in the grinding process and the polishing processes.

(b) Scribing Process

Next, scribing process (Step 20) will be explained. After the press forming, scribing is performed to the formed sheet glass material G in the scribing process.

As used herein, the scribing means that two concentric (inside concentric and outside concentric) cutting-plane lines (scratch in the form of a line) are provided in the surface of the sheet glass material G with a scriber made of a super alloy or diamond particles in order to obtain the ring-shape of the formed sheet glass material G having a predetermined size. The sheet glass material G scribed into two-concentric-circle shape is partially heated, and a portion outside the outside concentric circle and a portion inside the inside concentric circle are removed utilizing a difference in thermal expansion of the sheet glass material G, thereby obtaining the ring-shaped sheet glass material.

Note that a sheet glass material may be processed to have an outer diameter and uniformity, the degree of which scribing is not required for, and the ring-shaped sheet glass material may be obtained by forming an inner hole with a coring machine (drill) to the above sheet glass material.

(c) Shape processing Process (Chamfering Process)

Next, a shape processing process (Step S30) will be explained. Then shape processing is performed to the scribed sheet glass material G. The shape processing includes chamfering (chamfering of outer circumferential end portion and inner circumferential end portion).

The outer circumferential end portion and inner circumferential end portion of the ring-shaped sheet glass material G are chamfered using diamond abrasive grains.

(d) Grinding Process using Fixed Abrasive Grains

Next, a grinding process using fixed abrasive grains (Step S40) will be explained. In the grinding process using fixed abrasive grains, grinding is performed to the ring-shaped sheet glass material G using the fixed abrasive grains. For example, in the grinding using the fixed abrasive grains, removal stock is several μm to about 100 μm. For example, the fixed abrasive grains have the particle size of about 10 μm.

Figure 5A:
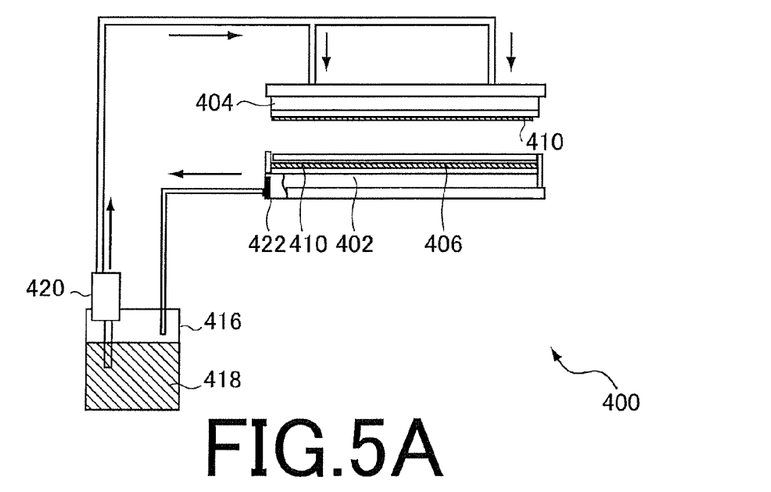
FIG. 5A is an overall view of an apparatus used to perform grinding using fixed abrasive grains.
Figure 5B:
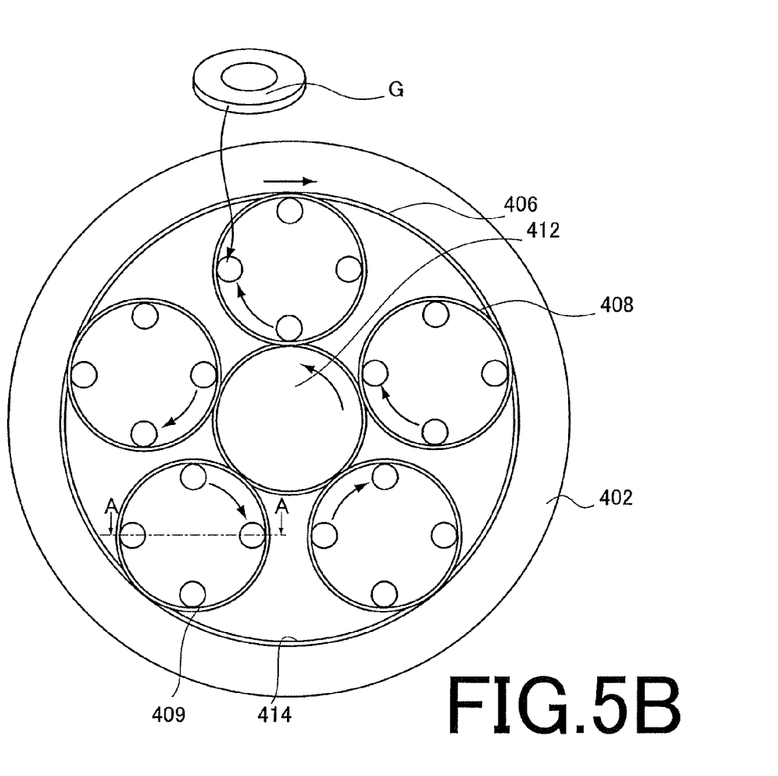
FIG. 5B is a view illustrating a carrier used in the apparatus of FIG. 5A.
Figure 6:
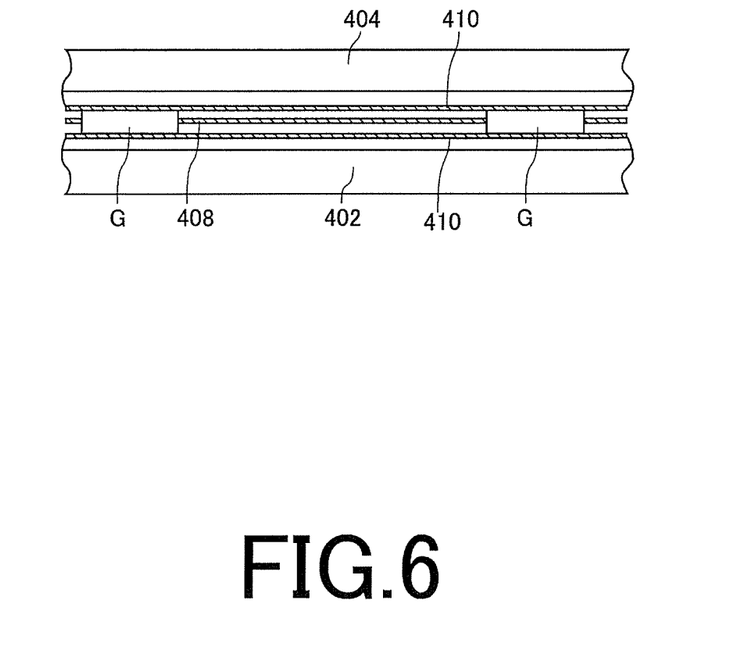
FIG. 6 is a view illustrating an arrangement in which a sheet glass material is ground.

Here, with reference to FIGS. 5A, 5B, and 6, the process for grinding the sheet glass material G will be explained. FIG. 5A is an overall view of an apparatus used to perform grinding using fixed abrasive grains. FIG. 5B is a view illustrating a carrier used in the apparatus of FIG. 5A. FIG. 6 is a view illustrating an arrangement in which a sheet glass material G is ground.

As illustrated in FIG. 5A and FIG. 6, an apparatus 400 includes a lower surface plate 402, an upper surface plate 404, an internal gear 406, a carrier 408, a diamond sheet 410, a sun gear 412, an internal gear 414, a reservoir 416, and a pump 420. The reservoir 416 includes coolant 418.

In the apparatus 400, the internal gear 406 is vertically sandwiched between the lower surface plate 402 and the upper surface plate 404. During the grinding, the plural carriers 408 are retained in the internal gear 406. In an example illustrated in FIG. 5B, the internal gear 406 retains the five carriers 408.

The surface of the diamond sheet 410 bonded to the lower surface plate 402 and the upper surface plate 404 in a planar manner constitutes a grinding surface. That is, the sheet glass material G is ground with the fixed abrasive grains using the diamond sheet 410.

As illustrated in FIG. 5B, the plural sheet glass materials G to be ground is retained while disposed in a circular hole provided in each carrier 408. During the grinding, the pair of principal surfaces of the sheet glass material G abuts on the diamond sheet 410 while being sandwiched between the lower surface plate 402 and the upper surface plate 404.

On the other hand, the sheet glass material G is retained on the lower surface plate 402 by the carrier 408 that includes a gear 409 in its outer circumference. The carrier 408 engages with the sun gear 412 and internal gear 414, which are provided in the lower surface plate 402. When the sun gear 412 is rotated in an arrow direction, each carrier 408 revolves around the sun gear 412 while rotating in an arrow direction as a planet gear. Therefore, the sheet glass material G is ground using the diamond sheet 410.

As illustrated in FIG. 5A, in the apparatus 400, a pump 420 supplies the coolant 418 in the reservoir 416 to the upper surface plate 404, and the pump 420 recovers the coolant 418 from the lower surface plate 402 to return the coolant 418 to the reservoir 416, thereby circulating the coolant 418. At this point, the coolant 418 removes swarf generated in the grinding from the grinding surface. Specifically, in the apparatus 400, when the coolant 418 is circulated, the filter 422 provided in the lower surface plate 402 filtrates the coolant 418 to retain the swarf in the filter 422.

In the grinding apparatus 400, the grinding is performed using the diamond sheet 410. Alternatively, the fixed abrasive grains of the diamond particles may be used instead of the diamond sheet 410. For example, a pellet that is formed by binding the diamond particles with a resin can be used in the grinding using the fixed abrasive grains.

(e) Edge polishing Process

Next, an edge polishing process (Step S50) will be explained. In the edge polishing process, edge polishing is performed to the sheet glass material G.

In the edge polishing, mirror surface finishing is performed to an inner-circumferential-side end face and an outer-circumferential-side end face of the sheet glass material G by brush polishing. At this point, slurry that includes fine particles such as cerium oxide as the loose abrasive grains is used. The contamination of dust and damage such as a flaw are removed by performing the edge polishing. Therefore, generation of ions such as a sodium and potassium which cause corrosion can be prevented.

(f) First Polishing (Principal Surface Polishing) Process

Next, a first polishing process (Step S60) will be explained. In the first polishing process after the edge polishing process, the first polishing is performed to the ground principal surface of the sheet glass material G. For example, removal stock in the first polishing is several μm to about 50 μm.

The first polishing is intended to remove the flaw left on the principal surface after the grinding using the fixed abrasive grains and the deformation. The apparatus 400 used in the grinding (Step S40) using the fixed abrasive grains is used in the first polishing. At this point, the first polishing differs from the grinding using the fixed abrasive grains in the following points. That is, in the first polishing process, the slurry of the turbid loose abrasive grains is used instead of the fixed abrasive grains. In the first polishing process, the coolant is not used. In the first polishing process, the resin polisher is used instead of the diamond sheet 410.

For example, the slurry of the turbid fine particles such as cerium oxide (particle size: diameter of about 1 μm to about 2 μm) is used as the loose abrasive grains used in the first polishing.

(g) Chemically Strengthening Process

Next, a chemically strengthening process (Step S70) will be explained. In the chemically strengthening process after the first polishing process, the first polished sheet glass material G is chemically strengthened.

For example, a mixed solution of potassium nitride (60%) and sodium sulfate (40%) can be used as a chemically strengthening solution. In the chemically strengthening, for example, the chemically strengthening solution is heated to 300° C. to 400° C., the washed sheet glass material G is pre-heated to 200° C. to 300° C., and the sheet glass material G is dipped in the chemically strengthening solution for three to four hours. Preferably, in order that the whole principal surfaces of the sheet glass material G are chemically strengthened, the dipping is performed while the plural sheet glass materials G are accommodated in a holder by retaining the sheet glass materials G at the end faces.

When the sheet glass material G is dipped in the chemically strengthening solution, the lithium ion and the sodium ion in the surface layer of the sheet glass material G are replaced by the sodium ion and the potassium ion which have relatively large ion radiuses in the chemically strengthening solution, respectively, thereby strengthening the sheet glass material G.

The sheet glass material G to which the chemically strengthening treatment is performed is washed. For example, after washing the sheet glass material G using the sulfuric acid, the sheet glass material G is washed using pure water and IPA (isopropyl alcohol).

(h) Second Polishing (Final Polishing) Process

Next, a second polishing process (Step S80) will be explained. In the second polishing process, the second polishing is performed to the sheet glass material G after being chemically strengthened and well washed. For example, removal stock in the second polishing is about 1 μm.

The second polishing is intended to perform mirror surface polishing to the principal surface. The apparatus 400 that is used in the grinding (Step S40) using the fixed abrasive grains and the first polishing (Step S60) is used in the second polishing. The second polishing differs from the first polishing in terms of the kind and particle size of the loose abrasive grains, and hardness of the resin polisher.

For example, the slurry of the turbid fine particles such as colloidal silica (particle size: diameter of about 0.1 μm) is used as the loose abrasive grains used in the second polishing.

The polished sheet glass material G is then washed. A neutral detergent, pure water, and IPA are used in the washing.

The glass substrate for magnetic disk 2 having the surface irregularity, in which the flatness of the principal surface is 4 μm or less and the roughness of the principal surface is 0.2 nm or less, is obtained by the second polishing.

Then, as illustrated in FIG. 1, the magnetic layers 3A and 3B are deposited to the glass substrate for magnetic disk 2 to prepare the magnetic disk 1.

The flow of the manufacturing method illustrated in FIG. 2 is described above. In the flow of FIG. 2, the scribing (Step S20) and the shape processing (Step S30) are performed between the grinding using the fixed abrasive grains (Step S40) and the first polishing (Step S60), and the chemically strengthening (Step S70) is performed between the first polishing (Step S60) and the second polishing (Step S80). However the sequence is not limited to the embodiment described above. As long as the grinding using the fixed abrasive grains (Step S40), the first polishing (Step S60), and the second polishing (Step S80) are performed in this order, the scribing (Step S20), the shape processing (Step S30), and the chemically strengthening (Step S70) may appropriately be reordered.

In the present embodiment, because each of the first die 121 and the second die 122 has a concave shape to the dropping path of the gob $G_G$ in the press forming process, the gob $G_G$ is hard to stretch in the vertical direction even when viscosity of the gob $G_G$ is low. Further, the temperatures of the first die 121 and the second die 122 rise while the gob $G_G$ stretches toward the circumference. Thus, the first die 121 and the second die 122 becomes substantially flat. Then, it is possible to improve roundness of the manufactured sheet glass material G. Consequently, removal stock may be reduced in the chamfering process, and occurrence of cracks may be suppressed in the grinding process and the polishing processes.

Modification

In the embodiment described above, an example was explained in which each of the first die 121 and the second die 122 was made with bimetal construction; however, the present invention is not limited to this example. For example, one of the first die 121 and the second die 122 may be made with bimetal construction, while the other may not be made with bimetal construction.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alternations could be made hereto without departing from the spirit and scope of the invention.

What is claimed is:

1. A manufacturing method of a sheet glass material for a magnetic disk, the method including:
a dropping process for dropping a lump of molten glass, and
a pressing process for sandwiching at substantially the same time the lump from both sides of a dropping path of the lump using a pair of die surfaces that face each other, and performing press forming to the lump to obtain a sheet glass material,
at least one of the pair of dies having a concave shape with respect to the dropping path of the lump, the die having the concave shape with respect to the dropping path of the lump being formed by bonding a plurality of plates or thin films including materials each having a different coefficient of thermal expansion, the coefficient of thermal expansion of the materials constituting the plurality of plates or thin films in contact with the lump being higher than the materials constituting the plurality of plates of thin films not in contact with the lump, and the die having the concave shape being flattened by pressing the lump with the pair of dies.

2. The manufacturing method of a sheet glass material for a magnetic disk according to claim 1, wherein transition temperature Tg of the glass is equal to or higher than 600 degree Celsius.

3. The manufacturing method of a sheet glass material for a magnetic disk according to claim 1, wherein viscosity of the lump is equal to or lower than 700 dP·s in the press forming process.

4. The manufacturing method of a sheet glass material for a magnetic disk according to claim 1, wherein temperatures of portions of the pair of dies that contact the lump are equal to or lower than a strain point of the glass.

5. The manufacturing method of a sheet glass material for a magnetic disk according to claim 1, wherein the glass contains, as converted based on the oxide, denoted as molar percentages: 50 to 75% $SiO_2$, 1 to 15% Al2O3, totally 5 to 35% at lease one component selected from the group of $Li_2O$, $Na_2O$, and $K_2O$, totally 0 to 20% at lease one component selected from the group of MgO, CaO, SrO, BaO, and ZnO, and totally 0 to 10% at lease one component selected from the group of $ZrO_2$, $TiO_2$, $La_2O_3$, $Y_2O_3$, $Ta_2O_5$, $Nb_2O_5$, and $HfO_2$.

6. The manufacturing method of a sheet glass material for a magnetic disk according to claim 1, wherein the pair of dies is made with a first plate and a second plate bonded together, the first plate being arranged to contact the lump, and wherein coefficient of thermal expansion of the first plate is higher than 10×10-6/K while coefficient of thermal expansion of the second plate is lower than 10×10-6/K.

7. The manufacturing method of a sheet glass material for a magnetic disk according to claim 6, wherein the first plate is made of Al alloy (7075), SUS304, Copper, Stellite (Co Alloy), FCD (Ductile Iron), SDK61 (alloy tool steel), Nickel (HASTELLOY), or SS41 (mild steel) while the second plate is made of Colmonoy (Ni alloy), Titanium, or VM40 (hard metal).

8. A manufacturing method of a glass substrate for a magnetic disk, the method including:
a dropping process for dropping a lump of molten glass;
a pressing process for sandwiching at substantially the same time the lump from both sides of a dropping path of the lump using a pair of die surfaces that face each other, and performing press forming to the lump to obtain a sheet glass material; and
a machining process for machining the obtained sheet glass material,
at least one of the pair of dies having a concave shape with respect to the dropping path of the lump,
the die having the concave shape with respect to the dropping path of the lump being formed by bonding a plurality of plates or thin films including materials each having a different coefficient of thermal expansion, the coefficient of thermal expansion of the material constituting the plurality of plates or thin films in contact with the lump is higher than the materials constituting the plurality of plates of thin films not in contact with the lump, and the die having the concave shape being flattened by pressing the lump with the pair of dies, and
the machining process including a grinding process for grinding the principal surfaces using fixed abrasive grains, and a polishing process for polishing the principal surfaces using loose abrasive grains after the grinding process.

9. The manufacturing method of a glass substrate for a magnetic disk according to the claim 8, wherein the machining process includes chemically strengthening.

10. The manufacturing method of a sheet glass material for a magnetic disk according to the claim 1, wherein each of the inner surfaces of the pair of dies is an inner circumferential surface, and the pressing process is performed such that the lump spreads along the inner circumferential surface of the pair of dies.

11. The manufacturing method of a sheet glass material for a magnetic disk according to the claim 1, wherein the diameter of the lump of molten glass is smaller than that of the obtained sheet glass material after the pressing process.

12. The manufacturing method of a glass substrate for magnetic disk according to the claim 8, wherein each of the inner surfaces of the pair of dies is an inner circumferential surface, and the pressing process is performed such that the lump spreads along the inner circumferential surface of the pair of dies.

13. The manufacturing method of a glass substrate for magnetic disk according to the claim 8, wherein the diameter of the lump of molten glass is smaller than that of the obtained sheet glass material after the pressing process.

* * * * *